Jan. 13, 1970   M. HILMER ET AL   3,489,349
OUTBOARD THERMOSTATIC STEAM TRAP
Filed May 28, 1968   2 Sheets-Sheet 1

INVENTORS
Milton Hilmer
John W. Ritter
By Davis, Hoxie, Faithfull & Hapgood
Attorneys Jan. 13, 1970    M. HILMER ET AL    3,489,349

OUTBOARD THERMOSTATIC STEAM TRAP

Filed May 28, 1968    2 Sheets-Sheet 2

INVENTORS
Milton Hilmer
John W. Ritter
By Davis, Hoxie, Faithfull & Hapgood
Attorneys

# United States Patent Office 3,489,349
Patented Jan. 13, 1970

3,489,349
OUTBOARD THERMOSTATIC STEAM TRAP
Milton Hilmer, Quakertown, and John W. Ritter, Emmaus, Pa., assignors to Sarco Company, Inc., Allentown, Pa., a corporation of New York
Filed May 28, 1968, Ser. No. 732,714
Int. Cl. F16t 1/02; F16k 1/14
U.S. Cl. 236—58                                    4 Claims

ABSTRACT OF THE DISCLOSURE

A steam trap actuated by expansion bellows is arranged for self aligning axial movement with closure against line pressure to obtain a throttling of flow to prevent hammering. Low thermal inertia promotes sensitive operation. The body separates for ease of maintenance.

---

A thermostatic steam trap is a device which is used to allow condensate to be automatically removed from a steam line. A trap is a valve which cycles open and closed to periodically discharge condensate. During start-up of a steam system, there is a relatively large quantity of condensate. Therefore, steam traps frequently are designed to reamain open for greater periods of time when the system is cold. When the system is settled out at its operating temperature, only small quantities of condensate accumulate. The trap cycles by losing heat to the surroundings, thereby dropping in temperature and allowing the valve to open. Condensate near the temperature of the steam then flows through the trap reheating it and causing the valve to close.

Themostatic steam traps have for many years been successfully used to drain condensate from steam systems. The conventional radiator trap is a common example.

The operating principle of the thermostatic trap is to use a bellows that is partially filled with a volatile liquid whose boiling point is that of water or less. The pressure available to do work is the difference in the pressure on the outside compared to the inside of the bellows. This pressure difference multiplied by the effective area of the bellows is the amount of force available to operate the valve head toward and away from its seat. As long as the temperature of the medium surrounding the bellows is at or near steam temperature, the pressure on the inside of the bellows is the same as or slightly higher than that of the steam, depending upon the boiling point of the filling used. However, as the condensate surrounding the bellows begins to cool, the pressure on the inside of the bellows begins to decrease following the saturated vapor pressure curve of the medium used for filling. As this pressure drops, and since the pressure on the outside of the bellows remains constant, the bellows contracts and opens the valve head from its seat.

In the conventional thermostatic trap the inlet pressure tends to close the valve head. The amount of force exerted by this pressure is the pressure multiplied by the area of the seat. In order to open the valve, this force must be overcome. Therefore, the pressure inside of the bellows must continue to decrease until the differential pressure across the bellows results in a force equal to the thrust exerted by the pressure on the closed valve head. As equilibrium is reached, the valve head begins to open and flow starts through the trap. As this happens the pressure tending to keep the valve closed rapidly decreases and the valve head is driven to near full opening. The result is an undesirable blast-like discharge. For this reason the traps above described commonly have been called blast traps. This type of operation is undesirable. Firstly, blast discharge has a tendency to disturb the pressure balance inside of the steam system. Secondly, the rapid discharge rate causes pressure surges to be generated in the outlet piping of the trap. This promotes a water hammer condition which can be violent enough to damage the piping and personnel in the vicinity. Likewise, as the temperature surrounding the bellows element begins to increase, the pressure inside of the bellows element increases, and as the thrust of the element approaches that required to close the valve seat, the valve very suddenly closes creating pressure disturbances in the steam system which are very undesirable.

The purpose of this invention is to construct a steam trap of the thermostatic type in which the pressure inside of the trap, namely that surrounding the outside of the bellows, will tend to open rather than close the valve. When this arrangement is accomplished, the bellows element must be so designed as to exert a valve closing force that will be greater than the force on the valve head that is generated by the steam pressure inside of the steam trap multiplied by the seat area. With this improved configuration, the trap will open very slightly as soon as the force exerted by the element falls slightly below the thrust exerted by the steam pressure on the seat. Any further decrease in pressure inside of the bellows allows the valve head to move a proportional distance from the seat thereby increasing the flow rate. In other words, this configuration avoids snap action or blast-type discharge. The improved trap actually progressively throttles the flow. The amount of flow is dependent upon the pressure inside the bellows which in turn is primarily a function only of the temperature surrounding the bellows.

Because thermostatic traps must perform reliably without servicing attention for long periods of time under conditions of teperature extremes with highly corrosive and deposit laden substances, it is highly desirable to provide a trap element which is not dependent upon the close tolerances or pivotal bearings which characterize much of the known forms of thermostatic trap. The trap of the present invention is designed to rely only upon straight-line axial forces and is designed to accommodate misalignment without binding. The guiding surfaces are spaced apart to provide accurate guidance without the need for close fits or large bearing areas which tend to bind with slight misalignment or deposit buildups.

The unitary screw-in nature of the element of the present invention permits rapid replacement upon failure or on a periodic maintenance schedule. The split housing permits easy access to the element for service without disturbance of the system piping.

One form of this invention will be described with reference to the accompanying drawings in which.

Figure 1:
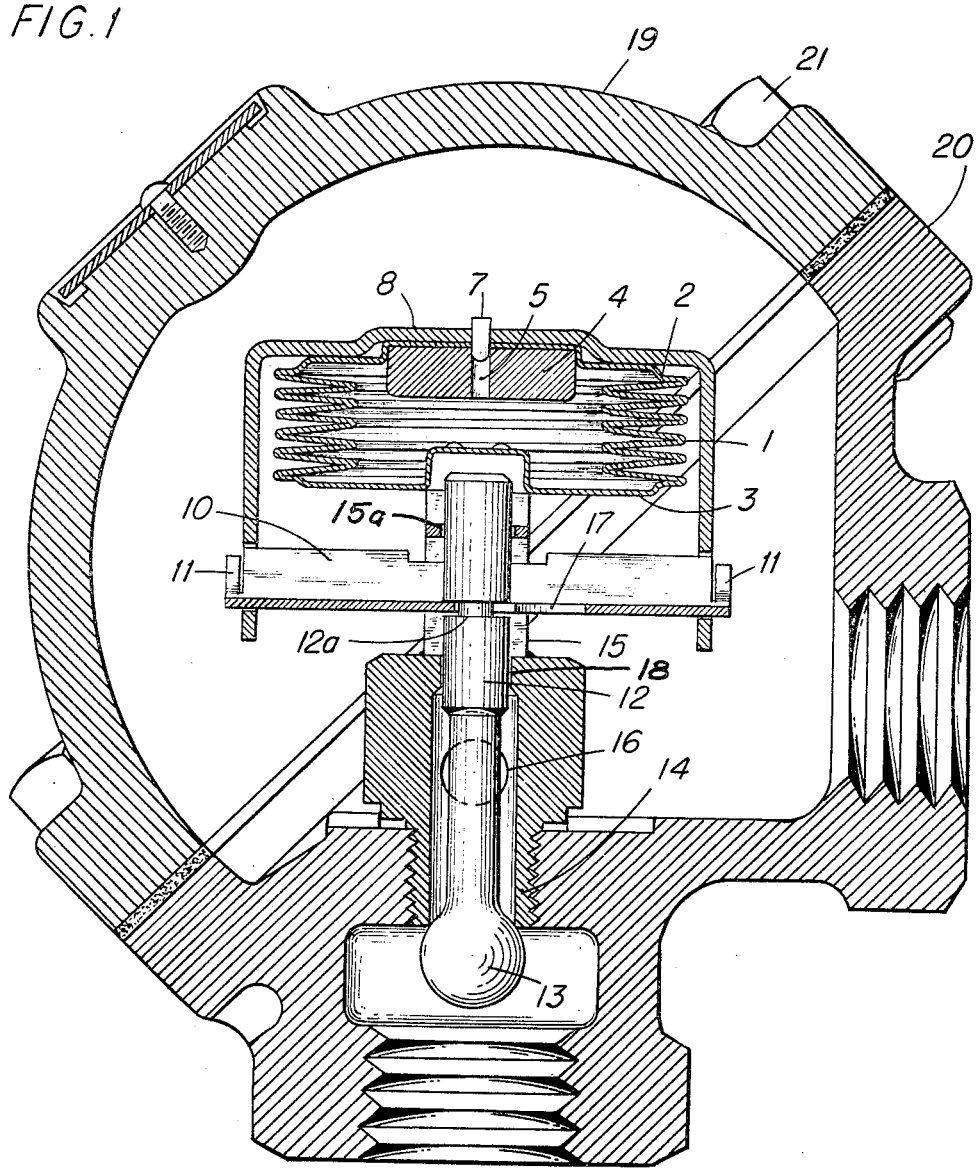
FIGURE 1 is a side elevational view in section of the steam trap of the present invention with the operating assembly installed in the enclosure with the valve closed.

Referring now to FIGURE 1, the operating assembly is fitted within an enclosure comprising body 20 and cover 19 secured to the body with machine screws 21. The body is provided with inlet and outlet apertures for connection to the system piping. Cover 19 is removable for easy access to the operating assembly, for service or replacement. By locating the joint between the cover and body as shown, access for conventional tools is maximized.

Figure 2:
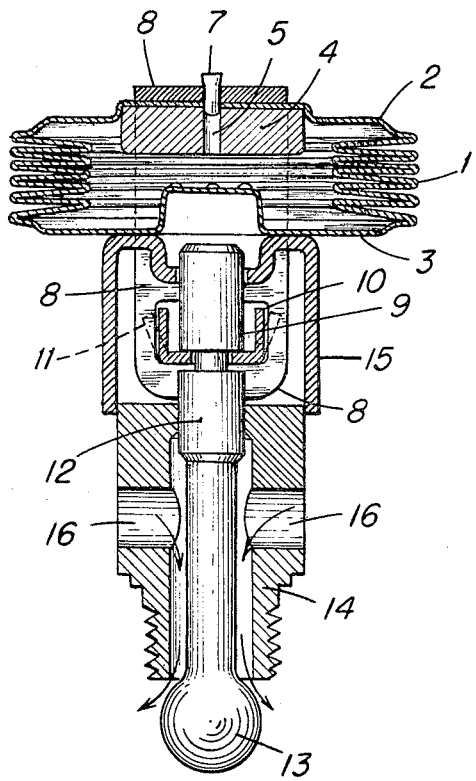
FIGURE 2 is a front elevational view in section of the operating element shown in FIGURE 1 with the valve open.
Figure 3:
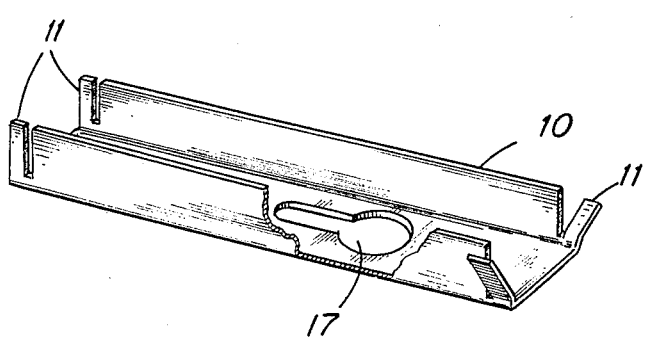
FIGURE 3 is a perspective view of the beam element.

The operating assembly will now be described with reference to both FIGURE 1 and FIGURE 2. The top of bellows 1 is hermetically sealed to top plate 2 and the bottom of bellows 1 is hermetically sealed to bottom plate 3. The opening in top plate 2 is closed with top closure 4. Top closure 4 is provided with a small hole 5. After these four parts are hermetically joined together a predetermined amount of volatile fluid is injected into the interior of the bellows assembly. The boiling point of this fluid is pressure dependent and is ultimately dictated by the flexibility of bellows 1. The more flexible the bellows, the higher can be the boiling point of the filling. Conversely, the stiffer the bellows the lower must be the boiling point of the filling. The bellows assembly 1 is then evacuated through hole 5 and sealed under vacuum with sealing stopper 7. To top closure 4 is fixedly attached to yoke 8. The bottom extremity of yoke 8 has two rectangular apertures 9 to slideably accommodate a beam 10. Once beam 10 is inserted into yoke 8 it is prevented from falling out by bending tabs 11 on beam 10 outwardly at an angle. In the center of beam 10 is a small opening larger at one end than the other in the style of a keyhole. This opening 17 is illustrated in FIGURE 3. The smaller end is large enough to accommodate valve stem groove 12A. The diameter of the opening 17 in beam 10 is large enough at the other end to accommodate the major diameter of stem 12. As the valve stem is positioned near the center of beam 10, the smaller end of opening 17 in the center of the beam is small enough to fit into the groove 12A thereby rigidly attaching beam 10 to valve stem 12.

To the bottom end of valve stem 12 is welded the valve head or poppet 13. As long as valve poppet 13 is in contact with the opening in valve seat 14, the trap is closed and no flow can occur. As valve poppet 13 moves away from the valve seat 14 flow can occur from the inlet of the trap to the outlet. To the bottom plate 3 of bellows 1 is attached lower yoke 15. This yoke in turn is rigidly attached to valve seat 14. Thus, the top 4 of bellows 1 is rigidly attached through the various members to the valve poppet 13 and the bottom 3 of bellows 1 is rigidly attached to seat member 14. Therefore, as bellows 1 expands, valve poppet 13 moves closer toward valve seat 14 and, conversely, as bellows 1 contracts valve poppet 13 moves farther away from seat 14.

Referring to FIGURE 1, as steam and condensate flow into inlet, a pressure is developed inside of the body and is exerted on the exterior of bellows 1. If the temperature of the medium flowing into the inlet is at saturated steam temperature or slightly below, the amount of pressure developed inside of the element will be that corresponding to the vapor pressure curve of the filling fluid which is chosen to be greater than the inlet pressure at that temperature. Bellows 1 expands driving valve poppet 13 onto seat 14 to prevent flow through the trap. As the temperature inside of the trap begins to fall, as a result of heat loss from body, the vapor pressure in the bellows begins to decrease following the saturated pressure curve of the liquid filling. A further decrease in temperature reduces the pressure inside of the bellows sufficiently to allow the pressure within the trap body acting on valve poppet 13 to overcome the force of the bellows thereby allowing the valve poppet 13 to move away from seat 14. Condensate from the interior of the trap body flows through holes 16 in seat member 14 and thence through the valve clearance made by the movement of the valve poppet 13 away from the seat 14. The amount of clearance opening will be dependent upon the pressure inside of the bellows. As this decreases, the opening will increase. As flow continues, water will be discharged from the outlet of the trap, the trap remains open until the temperature of the water or the temperature of the steam flowing into the inlet is high enough to create a greater pressure inside of bellows 1 to overcome the opening force exerted by the pressure in the valve body on the valve seat area 14. In actual operation the seat clearance is automatically adjusted to allow constant flow through the trap as long as the temperature of the incoming mixture to the trap is below a certain point.

The temperature at which the trap begins to open is determined by the spring rate of bellows 1, the boiling point of the filling fluid, the area of the seat and the initial pressure within the bellows element. These several variables can be so designed as to allow the trap to open at a definite temperature below saturated steam temperature regardless of the pressure. In other words, if the trap is operating at or near atmospheric pressure, the steam temperature will be 212° F. and the trap can be fashioned to open at say 10° below steam or when the temperature falls to 202° F. On the other hand, if the steam pressure entering the trap is at 100 p.s.i., the steam temperature will be 338° F., and the trap will then open again when the temperature falls 10° below 338° F., namely, 328° F. This is a very important characteristic of this trap because in many cases blast traps do not open at the same number of degrees depression below the saturated steam temperature and consequently have a tendency to either blow steam or hold back condensate excessively.

It is extremely important to maintain proper alignment of the operating assembly in order to avoid improper seating of valve poppet on valve. This is accomplished in this design by having a rigid stem 12 acting in two spaced aligned guides, namely, the guide bore 18 in seat member 14 and the hole 15a in lower yoke 15. With this configuration perfect alignment is assured between valve poppet 13 and valve seat 14 for positive closing and minimum wear on the seating surface. Derivation of alignment from spaced surfaces of limited contact area reduces binding and sticking. Transmitting bellows force through elongate hole 17 in beam 10 to groove 12a of valve stem 12 allows for limited wobble to compensate for imperfect alignment of the bellows force with the valve stem axis.

The life expectancy of a bellows is materially reduced when the forces exerted on the bellows are in a direction other than axial. That is to say, any side thrust on the bellows will materially shorten its life expectancy. This is due to the fact that the stress concentration in the bellows are not uniform. This can be visualized by an analysis of the bellows configuration. It is quite free to move along its central axis. However, if one tries to bend the bellows in a direction perpendicular to this axis, forces on one side are increased where forces on the other side are decreased. The increased forces coupled with the forces necessary for moving the valve head may very seriously affect life of the bellows. Therefore, in the present invention great care was taken to insure that the forces on the bellows would be exclusively axial. The bottom 3 of the bellows 1 is rigidly attached to the seat. The top 4 of the bellows is attached to the valve poppet 13 through yoke 8 and beam 10. Since beam 10 is joined to valve stem 12 via an elongate hole, the beam can laterally move with respect to valve stem 12. Thus, no side thrust can be imposed upon the bellows.

The best of devices at times fail and need replacement. It is extremely important that the thermostatic element, including head and seat, can be removed from the body of the trap without disturbing the piping. Disturbing piping not only is expensive, but when piping has been in use for a number of years it is almost impossible to disassemble piping without the necessity of replacing that piping. According to the present invention, the entire thermostatic operating assembly, including head and seat, is a unitary assembly that can be put into the trap body by simply removing cover 19 which is held to the body 20 by cap screws 21. This cover is attached at an angle to the body from the horizontal to allow the mechanic to apply a wrench to hex on seat member 14 once the cover 19 is removed.

The bellows and seat are so proportioned as to make it necessary to have a pressure inside the bellows greater than the steam pressure on the outside of the bellows in order to effect closure of the trap. Therefore, should the bellows element fail, the pressure inside of the bellows will be the same as the pressure on the outside of the bellows and the trap will open. This is a very important characteristic because it renders the trap fail-safe. It is apparent that if the bellows element fails, as it may after prolonged use, the trap will open. With prior known traps which remains closed after bellows failure, flooding ahead of the trap may occur with very disastrous results. Condensate water may back up sufficiently in a steam system to allow the water to pass into the turbine. The small amount of steam that the trap of the present invention will lose if the bellows fails and the trap opens is inconsequential compared to the damage that could occur should a trap fail to open to drain the condensate ahead of it.

The life expectancy of a bellows is predicated largely on the amount of movement to which it is subjected. In this design, the movement of the bellows is confined to the movement required to close the valve poppet and to open it sufficiently to attain the desired capacity or flow rate through the trap. The amount of contraction of the bellows is limited by the proportioning bottom plate 3 and top closure 4. When the bellows contracts to give sufficient flow through the trap, bottom plate 3 rests solidly on top closure 4 and prevents further contraction. On the other hand, when the bellows expands sufficiently to close the valve poppet 13 then beam 10, being connected to the top of the bellows through yoke 8 and also to stem 12 which cannot move farther upwards, thus prevents further expansion.

The entire operating is made of as thin a material as possible for two important reasons. First, the response of the trap is predicated on a temperature change. If the materials of construction were massive, the amount of heat required to heat and cool this mass would be great. As a result, temperature changes would be sluggish and the trap insensitive. Low mass permits rapid temperature response. Secondly, in all steam traps there is a tendency to vibrate as high velocity steam passes over objects in its path of flow. These vibrations have a tendency to decrease the life of the mechanism. If the mass of the construction is small, the natural frequencies of the vibrations will be higher than the range of normal vibration frequencies produced by the steam. Consequently, resonance is avoided and the forces exerted by the vibrations are minimized.

The entire construction may be made of stainless steel, monel or other non-corroding materials to prevent failure due to corrosive condensates.

For simplicity of language the claims describe the invention assuming the same orientation as in the drawings. It is apparent that such terms as "upper" and "lower" refer to the relative positions of various elements and the claims are intended to cover this structure in any attitude.

Many modifications within the scope of the invention will occur to those skilled in the art. Therefore, the invention is not limited to the specific embodiments illustrated and described.

What is claimed is:

1. A thermostatically controlled valve comprising a housing defining a chamber having an inlet passage for communication with a steam system and an outlet passage, a valve seat in the outlet passage, a valve member including a valve stem and having a head for cooperation with said seat on the outlet side thereof, an expandable sealed bellows within said chamber and coaxial with said valve stem, said bellows containing a fluid having a temperature dependent vapor pressure, the lower portion of said bellows being fixed relative to said valve seat, the upper portion of said bellows being connected to a yoke member which is associated with a beam member transverse of said valve stem and connected to the valve stem by means of an annular groove in the stem which is received in an elongated aperture in the beam, the aperture having a lateral dimension smaller than the adjacent diameter of the stem and larger than the diameter defined by the bottom of the groove to provide lateral clearance to accommodate axial misalignment of the valve stem and the bellows such that the only axial forces can be transmitted between the beam and the stem, the arrangement being such that an increase of temperature of the fluid within the bellows causes expansion of said bellows which results in valve closing axial motion of the valve stem in a direction opposite to the outlet flow.

2. The valve of claim 1 wherein the bellows, yoke, beam, valve member and valve seat are a unitary assembly which is adapted to be secured within the chamber by means of a threaded portion of the housing in communication with the outlet passage.

3. The valve unit of claim 2 wherein the housing comprises a body portion and a cover portion, the body portion having the inlet and outlet passages and means to secure the unitary assembly, said cover being removably secured to said body portion.

4. The valve unit of claim 3 wherein the joint between the cover and body portions lies in a plane at an oblique angle with the axis of the valve stem to provide unencumbered access to the unitary assembly.

References Cited

UNITED STATES PATENTS

| 47,182 | 4/1865 | Bishop | 236—56 |
| 1,911,230 | 5/1933 | Jones | 236—58 |
| 3,286,926 | 11/1966 | Domm et al. | 236—59 |
| 3,353,746 | 11/1967 | Foller | 236—59 |

FOREIGN PATENTS

| 570,457 | 8/1923 | France. |

WILLIAM E. WAYNER, Primary Examiner

U.S. Cl. X.R.

236—99